Dec. 20, 1949     C. A. BERG     2,492,091
TEXTILE SPINDLE
Filed Sept. 10, 1947
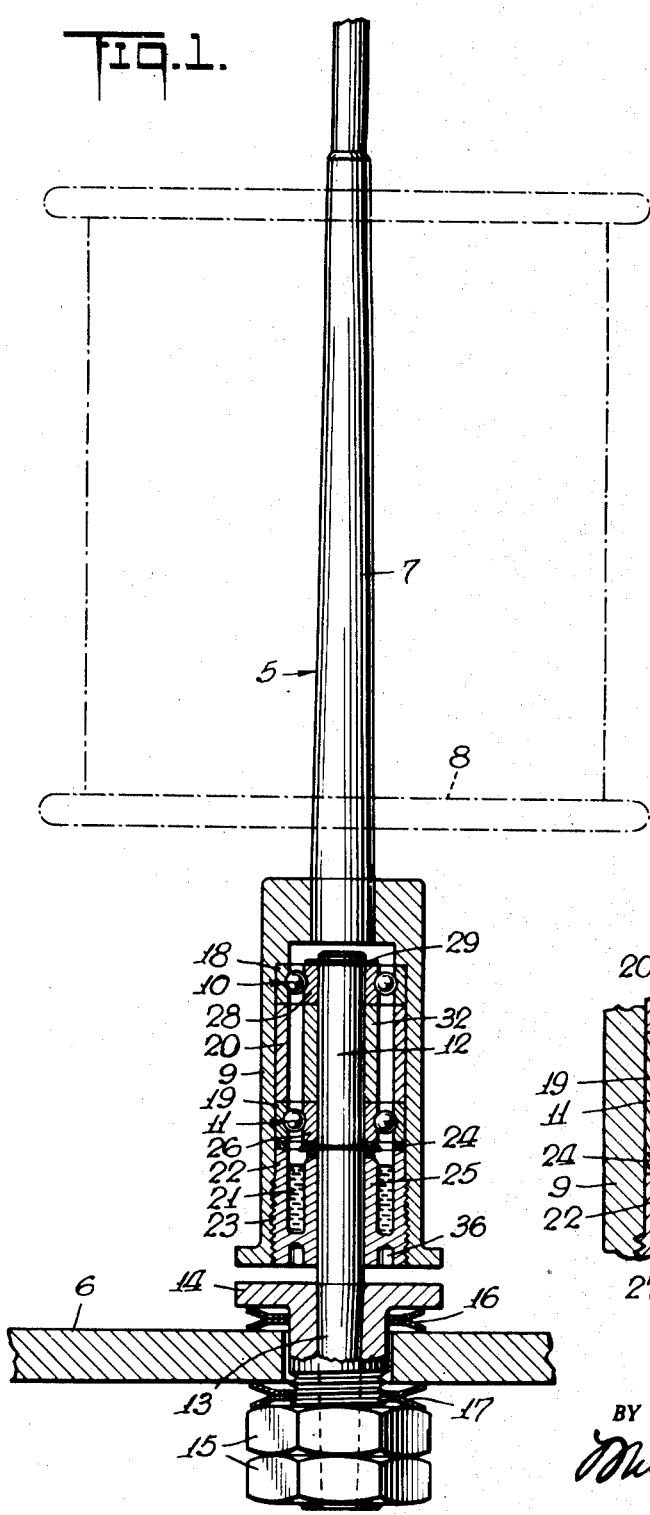
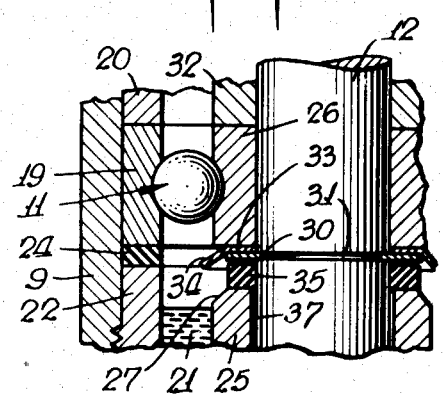
INVENTOR.
Carl A. Berg
BY
ATTORNEYS Patented Dec. 20, 1949

2,492,091

UNITED STATES PATENT OFFICE 2,492,091

TEXTILE SPINDLE

Carl A. Berg, New Britain, Conn., assignor to The Fafnir Bearing Company, New Britain, Conn., a corporation of Connecticut Application September 10, 1947, Serial No. 773,189

13 Claims. (Cl. 57—133)

My invention relates to spinning spindles and in particular to an improved lubricating system therefor.

It is an object of my invention to provide an improved device of the character indicated.

It is another object to provide improved means for lubricating a spinning spindle having an antifriction bearing suspension.

It is also an object to provide an improved antifriction bearing suspension for a spinning spindle.

It is in general an object to provide an improved spinning spindle with a bearing suspension that may give trouble-free operation for prolonged periods and that will be relatively easy to service.

Other objects and various further features of the invention will be pointed out or will occur to those skilled in the art from a reading of the following specification in conjunction with the accompanying drawings. In said drawings:

Fig. 1 is a vertical sectional view of a spinning spindle incorporating features of the invention, shown in position mounted on a rail; and Fig. 2 is an enlarged fragmentary sectional view of a part of the assembly of Fig. 1.

Briefly stated, my invention contemplates a spindle-bearing suspension in which the outer ring of an antifriction bearing rotates with the spindle and in which lubricant is retained in an annularly cupped portion or member to be carried with the rotating parts. Upon rotation, the lubricant rotates with the cup, and centrifugal action forces the lubricant upward to apply a continuous lubricating film to the outer bearing ring. When the spindle is stopped, the lubricant returns to the cup. In the specific form to be described, the cup is readily detachable from other parts of the spindle, and when so detached it retains all the drained lubricant, so that there need be no spilling of lubricant upon servicing the bearing. Novel splash-deflecting means are incorporated in the assembly in order to prevent loss of lubricant.

Referring to the drawings, my invention is shown in application to a spinning spindle 5 mounted upon a swing or rail 6. The spindle 5 includes a blade 7 upon which a bobbin 8 may be mounted, and the blade 7 may be carried and driven by a whorl 9. The whorl 9 is suspended by antifriction bearing means 10—11 on a stationary bearing stud 12, and the stud 12 may include a tapered bottom portion or shank 13 to be received in the correspondingly tapered socket of a base 14. In the form shown, the lower end of the base 14 is threaded to receive lock nuts 15, and pairs 16—17 of oppositely dished frusto-conical washers are interposed between the base 14 and the rail 6, and between the rail 6 and the nuts 15, in order to provide a resilient mounting. In the form shown, the antifriction bearing suspension 10—11 comprises spaced antifriction bearings having outer bearing rings 18—19 seated in a bore within the whorl 9 and spaced axially by means of a spacer sleeve 20.

In accordance with the invention, novel lubricant-retaining means are carried beneath the antifriction bearing suspension 10—11, for rotation with the spindle 5. In the form shown, an annular cup at the lower end of the whorl 9 serves to define the necessary reservoir 21. The cup 21 is shown to include an outer wall 22 having an upper portion closely to engage the bore of the whorl 9 and a lower portion 23 threaded or otherwise engaged to the whorl 9. If desired, a washer 24 of artificial rubber or other oil-resistant resilient material may be interposed between the lower outer ring 19 and the cup 21, for the purpose of effecting a seal and to prevent binding or damage to the abutting parts. The inner diameters of the outer rings 18—19, of the spacer sleeve 20, of the reservoir wall 22, and of the seal washer 24 are preferably substantially the same, or at least their adjacent surfaces preferably form a substantially continuous surface when in assembled relation. The inner wall 25 of the reservoir 21 preferably extends axially upward into axially clearing relation with the inner ring 26 of the lower antifriction bearing 11, for a purpose which will be clear. The inner wall 25 is also preferably radially free of the stud 12, as at 37, and the exposed upper face 27 of the wall 25 may be chamfered.

The inner rings 26—28 of the antifriction bearing may be mounted upon the stationary bearing stud 12 by means of snap rings. In the form shown, an upper snap ring 29 forms a shoulder for positioning the inner ring 28 and a lower snap ring 30 (seated in a groove 31) serves to locate the lower inner ring 26. An axial spacer sleeve 32 locates both inner rings 26—28 with respect to each other.

In order to guard against possible loss of lubricant, as when the spindle 5 is brought to a stop, a splash ring or other deflecting means 33 may be interposed between the snap ring 30 and the lower inner ring 26. The deflector 33 in the form shown is merely a washer with a plane surface in abutment with the rings 26—30 and with a frusto-conically dished skirt 34. The skirt 34 preferably extends radially outward so as to overhang parts of chamfered face 27 of the reservoir 21. If desired, a resilient washer 35 may be fitted over the inner wall 25 of reservoir 21 and under the snap ring 30. The washer 35 will be understood not to produce a bind between the rotating and nonrotating parts but merely to provide an additional sealing member to prevent loss of lubricant should there be splashing under the skirt 34.

With the spindle 5 at rest, the lubricant will be understood to be at a level and fully contained within the annular cup defined by the reservoir 21. This condition is illustrated in the drawings. When the spindle is rotated, as by a belt or tape drive to the whorl 9, the lubricant will be forced outward with a centrifugal action, and a film of lubricant will be caused to rise up along the wall defined by the inner surface of the outer bearing rings 19—18 and the sleeve 20. With a proper filling of the reservoir 21 and with a proper selection of lubricant viscosity to match the spindle load and speed, it will be appreciated that the lubricant film in the races for bearings 10—11 may be regulated for best bearing operation. When the spindle is stopped, the extended wall of lubricant will collapse, and there may be some splashing. In any event, however, it will be understood that the deflector skirt 34, the seal rings 24—35, and the chamfered face 27 may provide effective means for guarding against possible loss of lubricant.

It will be appreciated that I have described a relatively simple bearing suspension for a spindle. With my new suspension it has been found possible to operate a high-speed textile spindle for very extended periods of time between maintenance operations. Maintenance is a relatively simple procedure in that one has merely to tap the lower end of the bearing stud 12 through the tapered hole in the base 14 in order to remove the assembled spindle and then to apply a spanner, as in the spanner openings 36, in order to remove the reservoir cup 21. In removing the cup 21, it will be clear that no oil need be spilled.

While I have described my invention in detail for the preferred form shown, it will be understood that modifications may be made within the scope of the invention as defined in the appended claims.

I claim:

1. In a device of the character indicated, a support member to be secured on a generally vertical axis, antifriction bearing means on said support member and including an outer ring, a whorl having a bore in which said outer ring is seated, an annularly cupped portion carried by said whorl and defining a lubricant reservoir beneath said antifriction bearing means, said cupped portion facing said antifriction bearing means, and deflecting means carried between said antifriction bearing means and said cupped portion, said deflecting means including a circumferentially continuous radially outwardly projecting portion of sufficient radius to overstand parts of said reservoir.

2. In a spindle of the character indicated, a bearing stud including a lower portion to be secured to a rail with the axis of said stud generally vertical, antifriction bearing means including an inner ring, an outer ring, and antifriction elements therebetween, means for securing said inner ring to said stud, a whorl having a bore in which said outer ring is seated, an annular cup carried by the lower end of said whorl and including an outer shell with an inner diameter substantially equal to the inner diameter of said outer ring, there being a substantially continuous surface extending from the inner surface of said outer shell to the inner surface of said outer ring, for the purpose described.

3. A spindle according to claim 2, in which annular seal means of inner diameter substantially equal to the inner diameter of said outer ring is interposed between said cup and said outer ring, whereby the inner surfaces of said outer ring and of said seal means and of said outer shell may be substantially continuous.

4. In a spindle of the character indicated, a pair of antifriction bearings including inner rings, outer rings, and antifriction elements therebetween, support means for substantially fixedly mounting said inner rings on a common generally vertical axis, a whorl having a bore in which said outer rings are seated, and retaining means for retaining said outer rings seated in said bore, said retaining means including a cup having a wall to support one of said outer rings, the inner surface of the wall of said retaining means being substantially continuous with the inner surface of the lower of said outer rings.

5. In a spindle assembly, a stud, a pair of antifriction bearings including inner rings, outer rings, and antifriction elements therebetween, spacer sleeves between said inner rings and between said outer rings, a whorl having a bore in which said outer rings and the outer spacer sleeve are seated, an annular cup secured to said whorl and having an outer wall retaining said outer rings and sleeve in said bore, said outer wall and said outer rings and said outer sleeve having substantially the same internal diameter, deflecting means on said stud between said bearings and the inner wall of said cup, said deflecting means including an annular portion projecting radially over said inner wall, and abutment means on said stud for supporting said deflecting means said inner rings and said inner sleeve on said stud.

6. A spindle assembly according to claim 5, in which said abutment means includes spaced snap rings seated in spaced grooves on said stud.

7. In a spindle of the character indicated, a pair of antifriction bearings including inner and outer rings and antifriction elements therebetween, support means for substantially fixedly mounting said inner rings on a common generally vertical axis, a whorl having a bore in which said outer rings are seated, retaining means for retaining said outer rings seated in said bore, said retaining means including a cup having an outer wall to support said outer rings and an inner wall having sufficient clearance with said support means to permit of relative rotation, and deflecting means supported by said support means and including an annular portion projecting radially over said inner wall.

8. In a device of the character indicated, a whorl for generally vertical-axis rotation and having a bore, two antifriction bearings with outer rings seated in said bore, a cylindrical spacer sleeve between said outer rings, and an annularly cupped portion carried at the bottom of said whorl, said cupped portion being generally defined by an inner and an outer wall with sufficient annular volumetric capacity for all the lubricant needed for said bearings, the inner surfaces of said outer wall and of said outer rings and of said spacer being of substantially the same diameter, for the purpose described.

9. A device according to claim 8, in which said cupped portion is removable from the bottom of said whorl, whereby upon such removal the lubricant within the whorl need not spill or drip.

10. In a device of the character indicated, a whorl for rotation on a generally vertical axis, antifriction bearing means including an outer ring in said whorl and an inner ring for attachment to supporting means, said whorl being open at the bottom, and an annularly cupped closure member removably secured to the bottom of said whorl, said closure member including an inner and an outer wall, said outer wall being in sealing adjacency to said outer ring, the inner surface of said outer ring and of said outer wall being substantially continuous, the included level volume between said walls being sufficient when at rest to contain all the lubricant needed for said bearing.

11. A device according to claim 10, in which the upper edge of the outer surface of said inner wall is of a diameter less than the outer diameter of said inner ring, whereby lubricant draining from said inner and outer rings will necessarily be completely contained in said closure member.

12. In a device of the character indicated, a whorl, antifriction bearing means including an outer ring seated in said whorl and an inner ring for attachment to a support, and a removable annularly cupped closure member for the bottom of said whorl, said closure member including upstanding inner and outer walls with an included level volume between said walls exceeding the annular space radially outside the inner diameter of the outer bearing ring and between said outer ring and the bottom of said closure member, whereby at rest said closure member may wholly contain sufficient lubricant for said antifriction bearing means.

13. In a self-lubricating rotary device, a rotatable member having a bore therein, a supporting member to be fixedly carried in a generally vertical position and extending into said bore in said rotatable member, antifriction bearing means between said bore and said supporting member in said bore whereby said rotatable member will be supported by said antifriction bearing means and said supporting means for rotation on a generally vertical axis, an annularly cupped member removably secured to said rotatable member beneath said bearing means, said annularly cupped member including a bottom and generally radially spaced inner and outer walls defining an annular lubricant reservoir for lubricant to be raised centrifugally to said bearing means when said cupped member is rotated with said rotatable member, the volume of the lubricant space in said cupped member being in excess of the upwardly extending space which must be filled in order to centrifugally raise lubricant to lubricate said bearing means, whereby all of the lubricant necessary for centrifugally lubricating said bearing means may be carried by said cupped member and removed therewith from said rotatable member.

CARL A. BERG.

REFERENCES CITED

The following references are of record in the file of this patent:

UNITED STATES PATENTS

| Number | Name | Date |
|---|---|---|
| 589,994 | Wiegand | Sept. 14, 1897 |
| 1,449,836 | Proulx | Mar. 27, 1923 |
| 1,496,280 | Stewart | June 3, 1924 |